United States Patent [19]

Baer et al.

[11] 4,346,407
[45] Aug. 24, 1982

[54] APPARATUS FOR SYNCHRONIZATION OF A SOURCE OF COMPUTER CONTROLLED VIDEO TO ANOTHER VIDEO SOURCE

[75] Inventors: Ralph H. Baer, Manchester; Leonard D. Cope, Merrimack, both of N.H.

[73] Assignee: Sanders Associates, Inc., Nashua, N.H.

[21] Appl. No.: 159,548

[22] Filed: Jun. 16, 1980

[51] Int. Cl.³ .............................................. H04N 5/04
[52] U.S. Cl. .................................... 358/149; 358/148; 340/814
[58] Field of Search ................. 358/149, 148, 17, 150, 358/151, 153, 22, 183; 360/14; 340/721, 725, 734, 814

[56] References Cited

U.S. PATENT DOCUMENTS

| 4,011,401 | 3/1977 | Presti | 358/183 |
| 4,018,990 | 4/1977 | Long | 358/149 |
| 4,092,672 | 5/1978 | Aschwanden | 358/149 |
| 4,157,572 | 6/1979 | Kennedy | 358/183 |
| 4,203,135 | 5/1980 | Sasaki | 358/149 |
| 4,222,074 | 9/1980 | Breithaupt | 358/149 |
| 4,270,125 | 5/1981 | Weisbecker | 340/814 |

OTHER PUBLICATIONS

"The Tifax XMII Teletext Decoder", Norris & Garrard Texas Instrument.
"Video Effects Generator", Television, Apr. 1978, Parr, pp. 294-297.

Primary Examiner—Michael A. Masinick
Attorney, Agent, or Firm—Louis Etlinger; Richard I. Seligman

[57] ABSTRACT

Synchronization of a source of computer controlled video to another video source is achieved by providing clock pulses for the source of computer controlled video at some multiple of the horizontal synchronization frequency of the other video source to obtain frequency coherence and by detecting phase incoherence between the signals from the two sources and in response thereto causing the clock pulses to cease for a predetermined period to allow the source of computer controlled video to "slip" sync to obtain phase coherence.

23 Claims, 2 Drawing Figures

APPARATUS FOR SYNCHRONIZATION OF A SOURCE OF COMPUTER CONTROLLED VIDEO TO ANOTHER VIDEO SOURCE

BACKGROUND OF THE INVENTION

The television field has been enhanced by two relatively new consumer products: the video tape recorder or video disc player and the personal computer. The video tape recorder or video disc player plays back video tapes or discs for displaying images on the screen of a television receiver or monitor. The personal computer employs the television receiver or monitor as a convenient display for displaying images such as graphics or alphanumerics on the screen thereof. Because of the advent of these two relatively new products, applications have arisen wherein it is desirable to display simultaneously on the television receiver or monitor screen the outputs from a video tape or disc player and a personal computer.

In order to simultaneously display the outputs from these two devices, it is necessary to establish synchronization between them. This is a problem. Video tape recorders, for example, have neither absolute frequency stability nor freedom from flutter, tape slippage and other deviations from an ideal playback medium. In addition, in consumer quality video playback equipment there is no phase or frequency coherence between luminance and chroma signals. During the playback process the latter is reconstructed so that its burst frequency is correct. As a result the central timing source of the personal computer, that is, its system clock, cannot be frequency and phase locked directly to the chroma burst signal (3.58 MHz typically in NTSC systems) in an effort to synchronize the luminance signal of the personal computer with that of the playback unit.

Table I below illustrates the extent to which two different video tape recorders degrade the standard U.S. NTSC television signal, also shown in the table.

tively low-cost video tape recorders, such as BETAMAX, drive the tape from the capstan of a line-synchronous motor, and therefor, are subject to AC power line frequency variations. The latter in turn are quite variable, with a ±0.1% maximum frequency drift not uncommon. As a result both horizontal and vertical frequencies are subject to the same drift.

Because of the non-standard characteristics of video playback devices it is not possible to display images from these simultaneously with images derived from a source of computer controlled video unless some means of synchronization is provided.

Accordingly, it is an object of the present invention to provide a system for achieving synchronization between two video sources.

It is another object of this invention to provide means for synchronizing a source of computer controlled video to another video source.

SUMMARY OF THE INVENTION

The present invention has wide application whenever a computer terminal, such as the personal computers currently available, for example, the APPLE II, ATARI 400 and 800, Commodore PET, Radio Shack TRS 80, and others, is required to simultaneously display its own video output plus that coming from an external video source as, for example, a video tape recorder or disc player. Current models of such computers cannot be readily used in this fashion and at best it is possible to switch a television receiver or monitor between the video tape or disc source and the computer. Simultaneous display is not possible.

Frequency and phase coherence must be established in order to provide simultaneous display.

The synchronization signals generated by the personal computer are submultiples of its system clock. Frequency coherence between the computer and a video tape recorder, for example, is achieved by generating the system clock for the computer from the synchronization signals outputted by the video tape recorder. This is achieved by multiplying the frequency of the horizontal synchronization signals by some predetermined amount. Phase coherence between the synchronization signals of the video tape recorder and personal computer is achieved by detecting any phase incoherence and in response thereto, causing the clock pulses for the computer to cease for a predetermined

TABLE I

| | NTSC | U-MATIC | BETAMAX |
|---|---|---|---|
| Chroma sub-carrier ($f_c$) | 3.579545MHz ± 0.0003% Coherent | 3.579545MHz ± 0.001% Non-coherent | 3.579545MHz ± 0.001% Non-coherent |
| Horizontal Scanning Freq. ($f_H$) | 15,734.264Hz ± 0.0003% Locked to Chroma Ref. (15,750 monochrome) | 15,734Hz ± 0.01% Locked to Speed Servo (15,750 monochrome) | 15,730Hz ± 0.1% Locked to Line Freq. (15,750 monochrome) |
| Horizontal Jitter ($\Delta\tau_H$) | ±0.3 μsec. | ±0.250 μsec. | ±0.250 μsec. |
| Vertical Scanning Freq. | 59.94Hz ± 0.0003% Locked to Chroma Ref. (60 Hz monochrome) | 59.94Hz ± 0.01% Locked to Speed Servo (60 Hz monochrome) | 59.94Hz ± 0.1% Locked to Line Freq. (60 Hz monochrome) |

The lack of coherence of the color subcarrier and its looser frequency tolerance should be noted as well as the fact that the frequency tolerance on the frequency of the horizontal sync signals of the U-MATIC and BETAMAX is roughly three to thirty times worse than that of a standard NTSC signal. Further, it is to be noted that the vertical scanning frequency of the BETAMAX and U-MATIC playback units is similarly degraded over a standard NTSC specification. Relaperiod to allow the computer to "slip" sync and, thus, obtain phase coherence.

BRIEF DESCRIPTION OF THE DRAWINGS

The above-mentioned and other features and objects of this invention will become more apparent by reference to the following description taken in conjunction with the accompanying drawings, in which.

DESCRIPTION OF A PREFERRED EMBODIMENT

Figure 1:
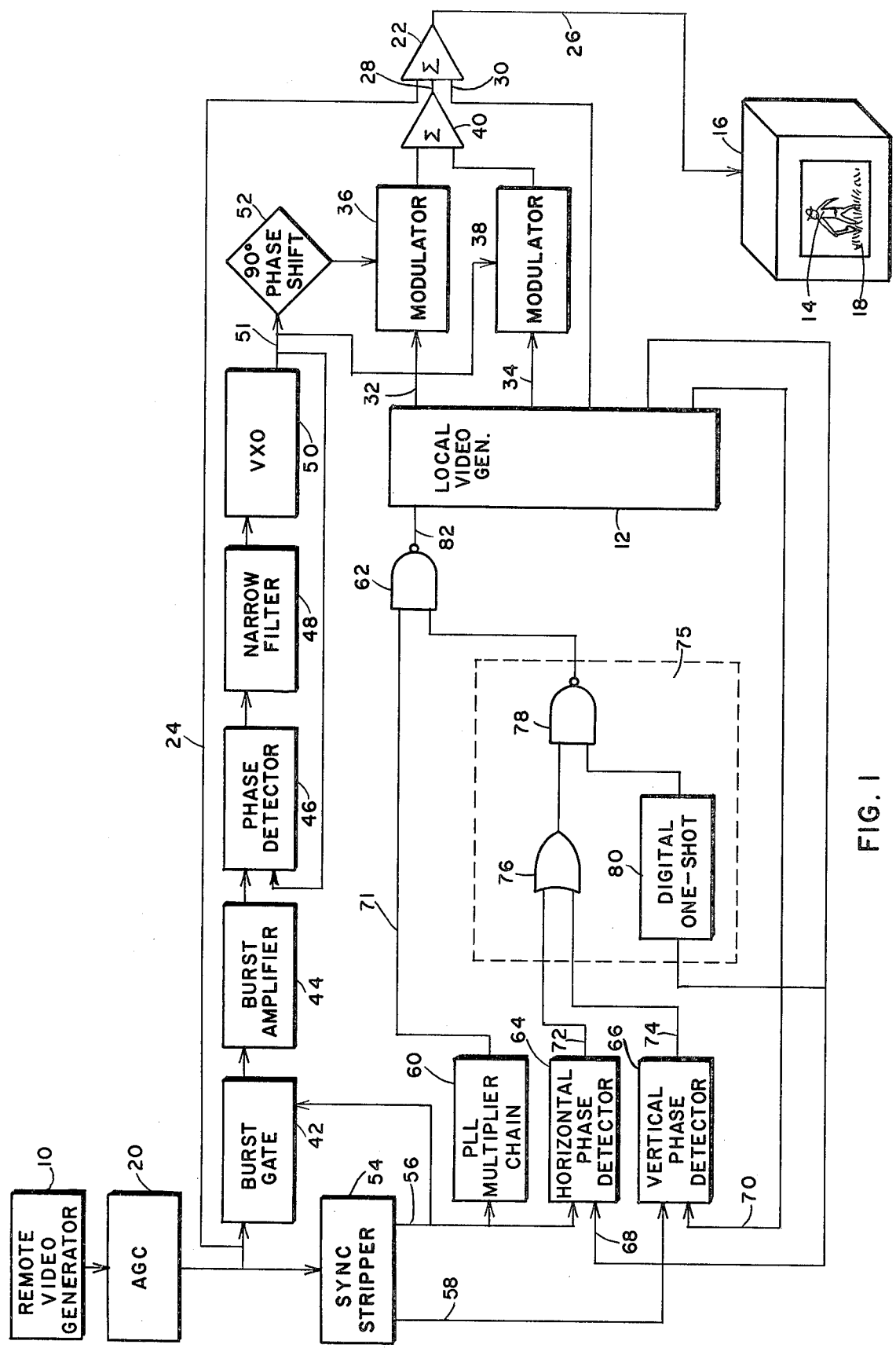
FIG. 1 is a block diagram of a system for synchronizing two video sources.

The function of the present invention illustrated in FIG. 1 of the drawings is to establish and maintain synchronization between signals of two video sources providing images to be displayed on the screen of a television receiver or monitor. In FIG. 1 the two video sources for providing video images are a remote video generator, such as a video tape recorder 10 and a local video generator 12. Remote video generator 10 provides images 14 on the screen of a television receiver 16 while the local video generator 12 provides video images 18 for display on the same television receiver screen. In the example, video image 14 is a graphic illustration while video image 18 is alphanumerics; however, either of the sources 10 and 12 can provide both or either graphics or alphanumerics. Typical of the local video generator is a modified personal computer such as the APPLE II. The local video generator must be capable of generating a luminance signal that is in the standard NTSC format. The signal must include a frame that contains two fields each having 262½ lines. The frame includes 525 lines, interlaced two to one. Most personal computers must be slightly modified so that their video signals conform to the interlaced nature of the NTSC format. However, this forms no part of the present invention. With the ever increasing use of personal computers, it has become desirable to display video images from these personal computers in conjunction with other sources, such as video tape or disc playback units. Synchronization between remote video generator 10 and local video generator 12 must be provided in spite of the degradation of luminance, chroma, and synchronization signals outputted from typical video playback equipment.

The system of FIG. 1 permits synchronizing the local video generator 12 to the remote video generator 10 to allow simultaneous display of video images from both sources on the television receiver 12. The output of the remote video generator 10, which includes luminance, chroma and vertical and horizontal synchronization signals, is applied to an AGC circuit 20 which maintains the output signals (levels) relatively constant. These signals are presented to a summer 22 via a line 24 for summing with other signals applied thereto. The output of summer 22 is coupled to the television receiver 16 via a line 26 in conventional fashion to provide pictorial representations 14 and 18 on the screen of the television receiver.

The other inputs to summer 22 are the "local" color and "local" luminance signals which are applied to summer 22 via lines 28 and 30, respectively. The designation "local" indicates that these signals are locally generated by the local video generator 12 and not generated from the remote video generator 10. The local video generator 12 provides alphanumeric and/or graphic interlaced video luminance signals to line 30 and to summer 22 where they are combined with the color coded composite video signal emanating from the remote video generator on line 24. The local video generator 12 produces standard R-Y and B-Y color-phase signals on lines 32 and 34. The signals on line 32 and 34 are applied to a pair of modulators 36 and 38.

Coupled to the AGC circuit 20 is a burst gate 42 linked to a burst amplifier 44, phase detector 46, narrow band filter 48, and a voltage controlled crystal oscillator 50. This system regenerates the chroma subcarrier on line 51. This system is the same as that used in color television receivers. The regenerated chroma subcarrier from line 51 is fed to the modulators 36 and 38 and summed in summer 40 in order to produce a local chroma signal 28. The method of producing a chroma signal is the same as that used in color television cameras. Local chroma signal 28 is fed to summer 22. For monochrome applications, this signal would be suppressed.

Also coupled to AGC circuit 20 is a sync stripper 54 providing remote horizontal synchronization signals on line 56 and remote vertical synchronization signals on line 58. The remote horizontal synchronization signals are applied as a second input to burst gate 42 to gate incoming signals through the burst gate 42, to apply it to the burst amplifier 44 and use it to phase-lock the voltage controlled crystal oscillator 50 via phase detector 46 and narrow band filter 48. The output from the voltage controlled crystal oscillator 50 is fed back to the phase detector 46 for comparison with the chroma burst amplifier 44 output in conventional fashion.

What has been described hereinbefore is standard and the present invention is principally concerned with the remaining portions of FIG. 1. As mentioned previously, the object of this system is to permit summing the local video generator's video signals with those derived from a remote video generator such as a video tape recorder which is a relatively unstable video source. Synchronization must be obtained both for the horizontal and vertical synchronization signals and associated video signals generated by the two sources.

The novel portion of the system includes a phase-locked loop multiplier chain 60 coupled to line 56 for receiving remote horizontal synchronization signals from sync stripper 54. The output of the phase-locked loop multiplier chain 60 is applied as one input to a NAND gate 62. The circuit also includes a pair of phase detectors 64 and 66. Horizontal phase detector 64 has as one input thereto the remote horizontal synchronization pulses from line 56 and as a second input thereto local horizontal synchronization signals via line 68 from the local video generator. The vertical phase detector 66 is similarly coupled like the phase detector 64 in that it receives as one input remote vertical synchronization signals from line 68 and at the other input local vertical synchronization signals from line 70 from the local video generator. The outputs 72 and 74 from the phase detectors 64 and 66 are applied to a gated digital one-shot 75 and in particular to an OR gate 76 thereof. The output from OR gate 76 is applied as one input to a NAND gate 78. The other input to NAND gate 78 is received from a digital one-shot 80 having as the input thereto horizontal synchronization signals from the local video generator 12. The digital one-shot 80 is configured to have an output pulse of a width equal to two cycles of the nominal clock frequency for local video generator 12.

A high frequency clock signal is delivered to AND gate 62 via line 71. The gated digital one-shot 75 is used to periodically interrupt the clock signal whenever phase detectors 64 and 66 deem it necessary. The action of gated digital one-shot 75 will be described in greater detail hereinafter. However, the effect of the circuit is to generate on line 82 an uninterrupted clock with a frequency of 14.32 MHz or an interrupted clock with an effective frequency of 14.29 MHz.

The circuitry just described comprises in substance two phase-locked loops. The first phase-locked loop includes the phase-locked loop multiplier chain 60 and the second phase-locked loop includes the phase detectors 64, 66, the gated digital one-shot 75, the NAND gate 62 and the local video generator 12. The function of the first phase-locked loop is to insure frequency coherence between the signals from the video tape recorder 10 and those of the local video generator 12, and the function of the second phase-locked loop is to insure phase coherence between the signals from the two sources.

A synchronous digital system's outputs occur at rates which are submultiples of its clock frequency. The rate of the horizontal synchronization signal of the local video generator 12 on line 68 and the rate of the vertical synchronization signal on line 70 are submultiples of the local video generator's clock frequency. The system clock is applied to the local video generator via line 82, from the NAND gate 62. This signal is derived by multiplying the frequency of the horizontal synchronization signal from the video tape recorder 10, received on line 56 from sync stripper 54, in a phase-locked loop multiplier chain by some constant factor. In this embodiment, the multiplication factor is 910 which will provide a nominal clock frequency for the local video generator of 14.32 MHz. This signal now has the proper frequency which will permit local video generator 12 to output horizontal and vertical synchronization pulses on lines 68 and 70 that are indeed identical in frequency to those of remote video generator 10. If the horizontal and/or vertical synchronization signals from the video tape recorder vary, then the clock signal applied on line 82 will vary accordingly, since the clock signal is derived by multiplying such varying horizontal and vertical synchronization signals in the phase-locked loop multiplier chain 60.

While the frequency of the horizontal and vertical synchronization signals from the local video generator 12 are made equal to those from the remote video generator 10 by varying the clock of the local video generator 12 in accordance with any variance of the horizontal and vertical synchronization signals from the remote video generator, these signals bear no absolute phase relationship to those of the synchronization signals from the remote video generator. It is the function of the phase detectors 64 and 66 to decode the phase relationship of two sets of horizontal and vertical synchronization signals (those from the remote video generator and those from the local video generator). Whenever the phase detectors 64 and/or 66 detect a phase difference between the synchronization pulses from the remote video generator 10 and the synchronization pulses from the local video generator 12, they provide outputs via lines 72 and 74 to the OR gate 76 which applies an output to NAND gate 78. The NAND gate 78 is enabled by the output from the digital one-shot 80. Thus, when there are inputs to the NAND gate from OR gate 76 and the digital one-shot 80, the output of NAND gate 78 disables the NAND gate 62 preventing the application of clock signal to the local video generator 12.

Figure 2:
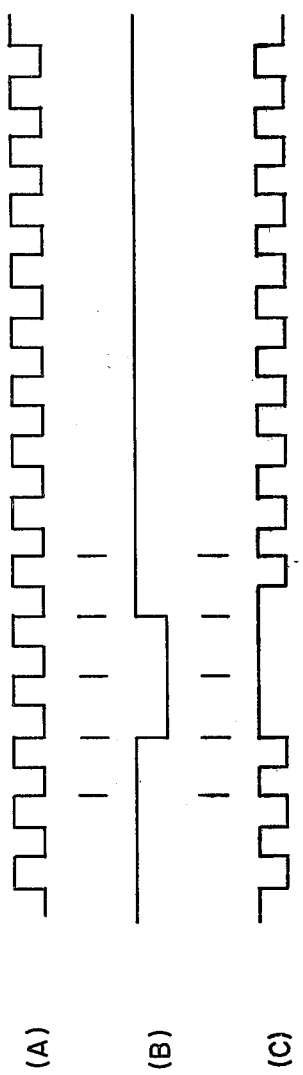
FIG. 2 illustrates waveforms obtained from the system of FIG. 1 which are useful in explaining the operation thereof.

This is illustrated by the waveforms of FIG. 2 of the drawings. Waveform A of FIG. 2 illustrates the clock pulses applied to NAND gate 62 on line 71. When either or both of the phase detectors 64 and 66 detects a phase incoherence between the synchronization signals from the video tape recorder and the local video generator, the NAND gate 62 is disabled for the period of the digital one-shot 80. This period is the duration of two 14.32 MHz clock pulses. This is illustrated by waveforms B and C of FIG. 2. The output of the NAND gate 78 shown in waveform B disables the NAND gate 62 causing the cessation of clock pulses on line 82 from being applied to the local video generator 12. Since the digital one-shot has a width of two of the 14.32 MHz clock pulses as shown by waveform C of FIG. 2, the clock pulses applied on line 82 to the local video generator 12 cease for two of such clock pulses. The disruption of the clock pulses to the local video generator 12 causes the local video generator 12 to "slip" sync.

When the signals on line 68 and 70 from the local generator "slip" into the proper signal phase, lines 72 and 74 become inactive, NAND gate 78 is disabled, and the NAND gate 62 becomes enabled. An uninterrupted 14.32 MHz clock frequency is delivered to the local video generator 12.

The phase-locked loop defined by phase-locked loop multiplier chain 60 forms a minor phase-locked loop. The phase-locked loop defined by the phase detectors 64, 66, 14.32 MHz clock on line 71, gated digital one-shot 75, NAND gate 62, and local video generator 12 forms a major phase-locked loop.

While the major phase-locked loop is "slipping" sync to achieve lock, the minor loop is uninterrupted. Since these loops act independently, it is possible to design their characteristics for optimum performance.

The interaction between the minor and major phase-locked loops is subtle. When the system is first powered up, both loops are out of lock. Horizontal synchronization signals are stripped and fed to the minor phase-locked loop 60. It quickly achieves lock, within one or two fields. This lock interval is a function of the time constants used in the filter of the minor phase-locked loop. The minor phase-locked loop achieves lock independent of the major phase-locked loop.

The major phase-locked loop requires up to 910 fields to achieve lock. This interval is a function of the amount of slip that is allowed to occur, on a line to line basis, between the local video generator 12 and the remote video generator 10.

After the major phase-locked loop locks, phase and frequency compensations are performed by the minor loop. If the frequency of the line voltage increases, the speed of the remote video generator will increase, the frequency of the horizontal synchronization signals on line 56 will increase, the frequency of signals emanating from the minor loop 60 will increase, and the frequencies of the signals emanating from the local video generator 12 will increase. No phase errors will be detected by phase detectors 64 and 66. The minor phase-locked loop maintains control of the local video generator independent of the major phase-locked loop.

The key points of operation of the luminance synchronization circuitry are as follows:

(1) A minor phase-locked loop frequency locks a local video generator to a remote video generator.

(2) A major phase-locked loop phase corrects a local video generator so that it is in phase with a remote video generator.

(3) The minor phase-locked loop corrects for both frequency and phase variations of the remote video generator after initial lock up.

(4) The minor phase-locked loop operates totally independent of the major phase-locked loop. The minor phase-locked loop maintains lock even when the major phase-locked loop is not in a condition of lock.

While the system has been designed for use in conjunction with an APPLE II personal computer, it is clearly generic and applies to other computers having a video display output capability such as the aforementioned Atari, Radio Shack and Commodore personal computer systems. It can further readily be seen that the system of the present invention can be used additionally in conjunction with sources of video other than video tape or disc playback units. For example, television cable transmission or on-the-air transmission, after reception by a suitable TV receiver, could deliver the required video and synchronization signals as in the case of the video tape recorder source used in the embodiment described above. Signals derived from reception of such transmission may be similarly degraded in quality by the transmission medium, and the system of this invention will similarly produce acceptable synchronization results. Thus, it is to be understood that the embodiment shown is to be regarded as illustrative only, and that many variations and modifications may be made without departing from the principles of the invention herein disclosed and defined by the appended claims.

We claim:

1. Apparatus for synchronizing a source of computer controlled video to a second video source, comprising:
   a source of computer controlled video providing video and synchronization signals in which said synchronization signals are related to its system clock;
   a second video source providing video and synchronization signals; and
   first means responsive to the synchronization signals of said second video source for generating clock signals for said source of computer controlled video.

2. Apparatus as defined in claim 1 wherein said second video source is a video playback unit.

3. Apparatus as defined in claim 2 wherein said video playback unit is a video tape recorder.

4. Apparatus as defined in claim 2 wherein said video playback unit is a video disc player.

5. Apparatus as defined in claim 1 wherein said second video source is a broadcast program.

6. Apparatus as defined in claim 1 wherein said second video source is a cablecast program.

7. Apparatus for synchronizing a source of computer controlled video which outputs video and synchronization signals with a second video source which outputs video and synchronization signals, comprising:
   means for providing clock signals to said source of computer controlled video, the synchronization signals from said source of computer controlled video being related to said clock signals; and
   means for varying said clock signals to synchronize the signals provided by said sources in both frequency and phase.

8. Apparatus for providing synchronization between the outputs of a source of computer controlled video and a second video source, comprising:
   means for stripping the horizontal synchronization signals from the output of the second video source; and
   means for multiplying the frequency of said horizontal synchronization signals by a predetermined number for generating clock signals for the source of computer controlled video, such that varying the clock signals will vary the signals of the source of computer controlled video accordingly and provide frequency coherence between both sources, said signals of said source of computer controlled video being related to said clock signals.

9. Apparatus as defined in claim 8, further including means for determining phase incoherence between the output signals of the two sources and means for adjusting the clock signals accordingly.

10. Apparatus as defined in claim 9 wherein said adjusting means includes means for causing a cessation of clock signals to said source of computer controlled video.

11. Apparatus for synchronizing a local video generator with a remote video generator, comprising:
   a minor phase-locked loop for frequencing locking the local video generator to the remote video generator;
   a major phase-locked loop for phase correcting the local video generator such that it is in phase with the remote video generator;
   said minor phase-locked loop correcting for both frequency and phase variations of the local video generator after initial phase-locking by the minor and major phase-locked loops.

12. Apparatus as defined in claim 11 wherein said minor and major phase-locked loops operate independently such that the minor phase-locked loop maintains lock notwithstanding that the major phase-locked loop is not in a condition of lock.

13. Apparatus for synchronizing a source of computer controlled video to a second video source, comprising:
   a source of computer controlled video providing video and synchronization signals in which said synchronization signals are related to its system clock;
   a second video source providing video and synchronization signals; and
   first means responsive to the synchronization signals of such second video source for generating clock signals for said source of computer controlled video, said first means responsive including a first phase-locked loop coupled to the synchronization signals of said second signal video source for controlling the frequency of the synchronization signals of the source of computer controlled video.

14. Apparatus as defined in claim 13, further including second means responsive to the synchronization signals of said source of computer controlled video and said second video source for controlling the phase of said synchronization signals of said source of computer controlled video.

15. Apparatus as defined in claim 14 wherein second means responsive includes a second phase-locked loop coupled to the synchronization signals of said source of computer controlled video and said second video source.

16. Apparatus for synchronizing a source of computer controlled video to a second video source, comprising:
   a source of computer controlled video providing video and synchronization signals in which said synchronization signals are related to its system clock;
   first means responsive to the synchronization signals of said second video source for generating clock signals for said source of computer controlled video, said first means responsive including means coupled to the synchronization signals of said second video source for multiplying the frequency of the horizontal synchronization signals of said second video source by a predetermined number to provide clock signals for said source of computer controlled video which will cause the synchronization signals of said source of computer controlled video to be frequency coherent with the synchronization signals of said second video source.

17. Apparatus for synchronizing a source of computer controlled video to a second video source, comprising:
   a source of computer controlled video providing video and synchronization signals in which said synchronization signals are related to its system clock;
   a second video source providing video and synchronization signals;
   first means responsive to the synchronization signals of said second video source for generating clock signals for said source of computer controlled video; and
   second means responsive to the synchronization signals of said source of computer controlled video and said second video source for controlling the phase of said synchronization signals of said source of computer controlled video.

18. Apparatus for synchronizing a source of computer controlled video which outputs video and synchronization signals with a second video source which outputs video and synchronization signals, comprising:
   means for providing clock signals to said source of computer controlled video, the synchronization signals of said source of computer controlled video being related to said clock signals; and
   means for varying said clock signals to synchronize the signals provided by said sources in both frequency and phase, said varying means including means for multiplying the frequency of the horizontal synchronization signals of said second video source by a predetermined number.

19. Apparatus as defined in claim 18 wherein said means for varying said clock signals further includes means for occasioning a cessation of clock signals for a predetermined period of time when phase incoherence exists between the synchronization signals of both sources.

20. Apparatus for synchronizing a source of computer controlled video to a second source, comprising:
   a source of computer controlled video providing video and synchronization signals in which said synchronization signals are related to its system clock;
   a second video source providing video and synchronization signals;
   first means responsive to the synchronization signals of said second video source for generating clock signals for said source of computer controlled video, said first means responsive including a first phase-locked loop coupled to the synchronization signals of said second video source for controlling the frequency of the synchronization signals of the source of computer controlled video; and
   seond means responsive to the synchronization signals of said source of computer controlled video and said second source for controlling the phase of said synchronization signals of said source of computer controlled video, said second means responsive including a second phase-locked loop coupled to the synchronization signals of said source of computer controlled video and said second video source and having a first phase detector coupled to the synchronization signals of both video sources for generating a signal proportional to phase incoherence of the horizontal synchronization signals of said sources, a second phase detector coupled to the synchronization signals of both video sources for generating a signal proportional to phase incoherence of the vertical synchronization signals of said sources and means coupled to said detectors for causing brief cessation of said clock signals to said source of computer controlled video when either of said phase detectors indicates phase incoherence.

21. Apparatus as defined in claim 20 wherein said means for causing cessation of said clock signals includes a gated digital one-shot coupled to the outputs of said phase detectors and supplied with horizontal synchronization signals from said source of computer controlled video.

22. Apparatus as defined in claim 21 wherein said first means responsive includes means coupled to the synchronization signals of said second video source for multiplying the frequency of the horizontal synchronization signals of said second video source by a predetermined number to provide clock signals for said source of computer controlled video which will cause the synchronization signals of said source of computer controlled video to be frequency coherent with the synchronization signals of said second video source.

23. Apparatus as defined in claim 22 wherein said second phase-locked loop further includes a NAND gate coupled to the outputs of said multiplying means and said gated digital one-shot, the output of said NAND gate being applied to said source of computer controlled video.

* * * * *